1

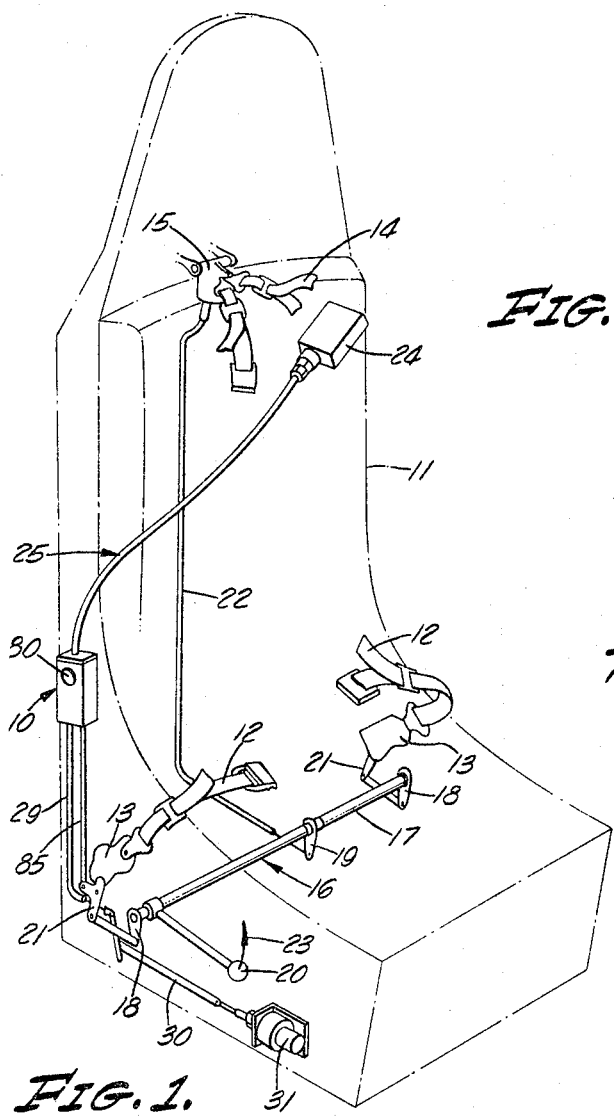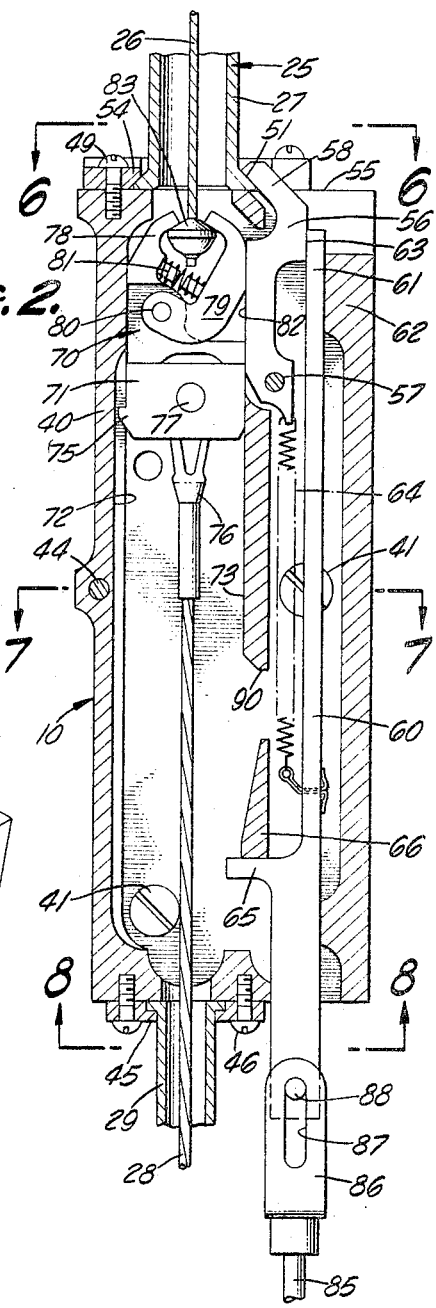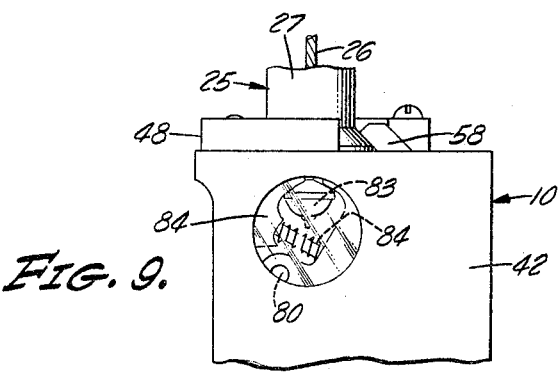

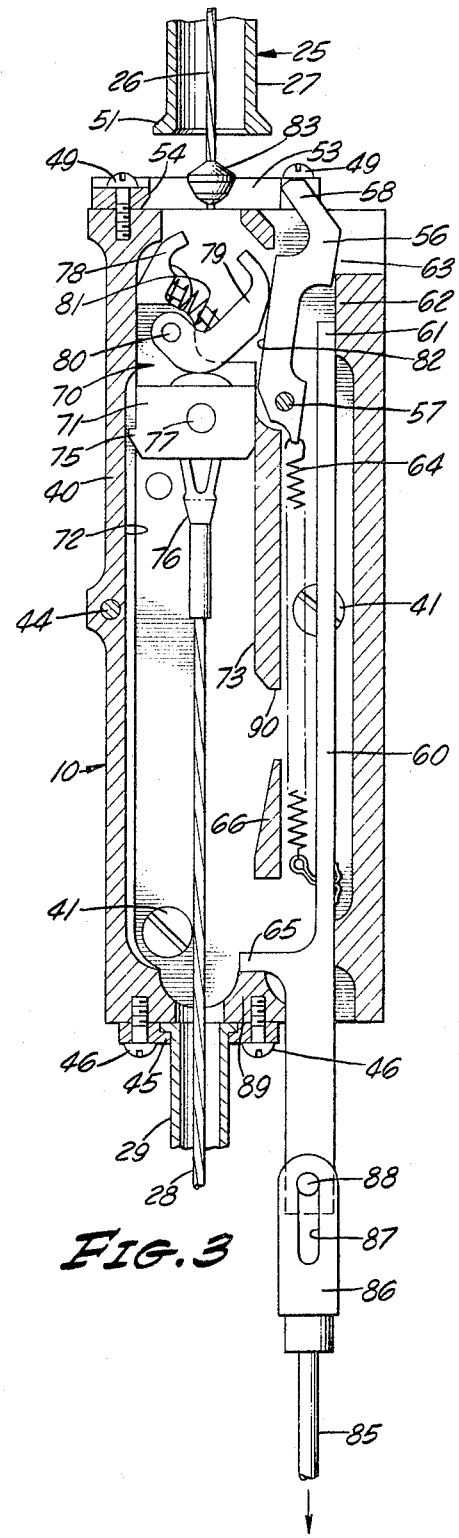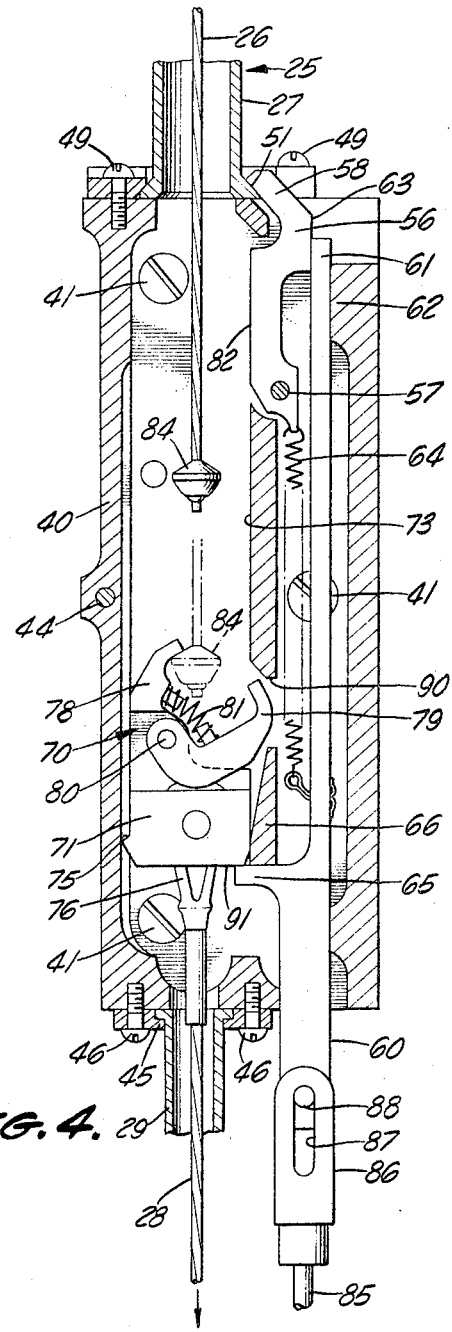
FIG. 3
FIG. 4
INVENTORS
WALLACE F. ZIEGLER
NORRIS D. WHITEHILL
BY
Lyon & Lyon
ATTORNEYS Sept. 6, 1966    W. F. ZIEGLER ET AL    3,270,387
FLEXIBLE ENCLOSED CABLE OPERATING AND DISCONNECT MECHANISM
Filed July 2, 1964    3 Sheets-Sheet 3
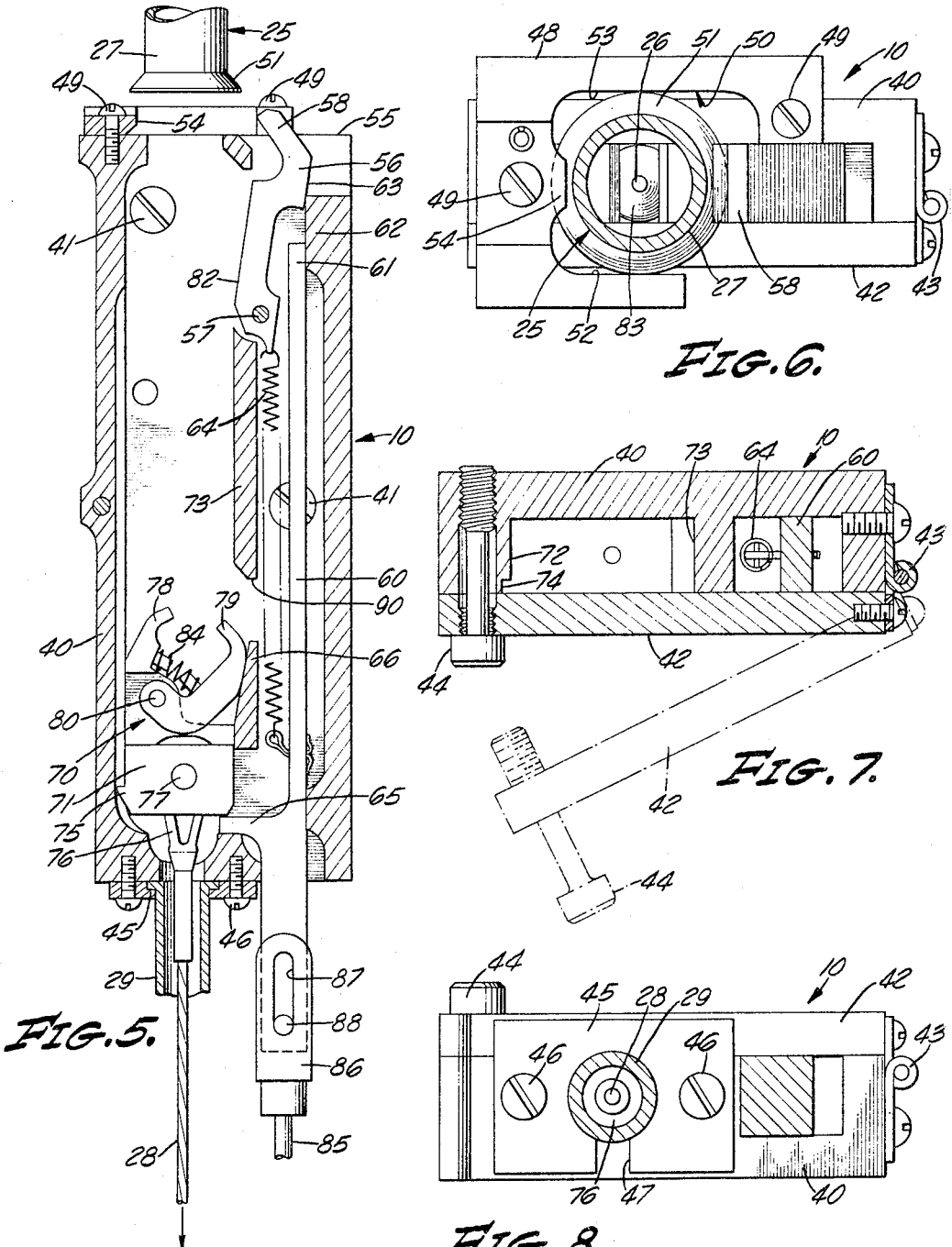
INVENTORS
WALLACE F. ZIEGLER
NORRIS D. WHITEHILL
BY
Lyon & Lyon
ATTORNEYS United States Patent Office 3,270,387
Patented Sept. 6, 1966

3,270,387
FLEXIBLE ENCLOSED CABLE OPERATING AND DISCONNECT MECHANISM
Wallace F. Ziegler, Glendale, and Norris D. Whitehill, Tujunga, Calif., assignors, by mesne assignments, to Walter Kidde & Company, Inc., a corporation of New York
Filed July 2, 1964, Ser. No. 379,780
11 Claims. (Cl. 24—230)

This invention relates to a mechanism for selectively disconnecting or sequentially operating and disconnecting a tension actuated cable and its enclosing sheath or housing and, in particular, is directed to such a mechanism for use with an aircraft ejection seat and personnel parachute for permitting separation of the seat and occupant either manually for egress or automatically during the ejection sequence.

While the mechanism of this invention may be used for many applications, there is at least one application for which the mechanism is particularly suited and that is as a component of an aircraft ejection seat and parachute deployment system. The series of operations for ejection are initiated by the occupant of the seat and preferably continue automatically through deployment of the parachute. Physical separation occurs between the seat and the aircraft and, in most systems, between the occupant and seat after clearing the aircraft. Many of the operations during the ejection sequence are conventionally actuated and controlled by flexible tension cables of the type that are enclosed within a rigid or flexible sheath or housing. Certain of these flexible actuated cables extend between two of the components of the aircraft-seat-occupant combination that are eventually separated during the ejection sequence and therefore, the flexible cable and enclosing sheath must be disconnected from one of the two separated components.

A more specific example of this requirement is found in the somewhat conventional arrangement for deploying the parachute by a drogue gun wherein the parachute is worn by the occupant and yet the drogue gun firing mechanism is activated by a flexible tension cable connected to a seat-mounted actuator. Since the occupant and parachute are subsequently separated from the ejection seat, such cable and its enclosing sheath must be disconnected from either the seat or the occupant. One conventional solution has been to construct such cable and sheath so as to fail in tension as a result of the separating forces, but there remains the indefinite possibility that such failure will occur during actuation and defeat such actuation. Moreover, it is highly desirable that the occupant have rapid and easy egress from the seat aside from the automatic ejection sequence without causing tensioning of the flexible cable to operate the drogue gun firing mechanism.

Accordingly, it is a principal object of this invention to provide a novel form of mechanism for sequentially operating and disconnecting a tension-actuated flexible cable enclosed within a sheath wherein a movable cable-grasping element functions to actuate and then release the cable with a latch functioning to retain the sheath during such actuation and thereafter release the sheath.

Another object of this invention is to provide a novel form of tension cable actuating and disconnect mechanism wherein the cable is grasped through a predetermined distance of tension motion to perform the desired tension actuation, the cable is then released, and then the cable-enclosing sheath is released all by means of tensioning by a single actuator.

A further object of this invention is to provide a novel form of tension cable operating and disconnect mechanism wherein longitudinal movement of a first slide means causes sequential actuation of the cable and disconnect of the cable and enclosing sheath, or longitudinal movement of a second slide means disconnects the cable and sheath from the mechanism without tension actuation of the cable. Still another object is to provide such a mechanism wherein separate tension cables may be employed for selectively causing such longitudinal sliding motion of the first or second sliding means.

Other and more detailed objects and advantages of this invention will appear from the following description and the accompanying drawings, wherein:

FIG. 1 is a perspective view of the mechanism of this invention installed in conjunction with an aircraft ejection seat apparatus.

FIG. 2 is a sectional elevation view of the mechanism of this invention showing the sheathed tension cable mounted in the mechanism ready for actuation.

FIG. 3 is a sectional elevation view similar to FIG. 2, but illustrating the components of the mechanism in a displaced relationship with the cable released for egress or ingress.

FIG. 4 is a sectional elevation view similar to FIG. 2, and showing the components of the mechanism in another relationship with the tension cable actuated and released.

FIG. 5 is a sectional elevation view similar to FIG. 4 showing the components in the relationship after additional movement from the relationship of FIG. 4 for releasing the cable enclosing sheath.

FIG. 6 is a sectional plan view taken substantially on the line 6—6 shown in FIG. 2.

FIG. 7 is a sectional plan view taken substantially on the line 7—7 shown in FIG. 2 with the open position of the mechanism closure shown in phantom lines.

FIG. 8 is a sectional bottom view taken substantially on the line 8—8 shown in FIG. 2.

FIG. 9 is a fragmentary elevation view of the top portion of the mechanism.

Referring now to FIG. 1, the mechanism of this invention, generally designated 10, is shown as mounted on the side of an aircraft ejection seat 11. While mechanism 10 will here be described as performing a particular function in conjunction with an aircraft ejection seat system, it is to be understood and will readily appear to those skilled in the art that the mechanism 10 may be employed with various other systems and the like wherein similar functions are performed or desired. The ejection seat and system may be of any conventional type wherein the occupant is restrained within the seat during ejection from the aircraft and the seat and occupant are subsequently separated. Lap belts 12 are provided and are connected to the seat 11 by conventional release assemblies 13 on each side of the ejection seat. A shoulder harness 14 is connected to the upper portion of the ejection seat by another conventional release assembly 15. A "ditching" mechanism, generally designated 16, is permanently installed on the seat 11 for permitting rapid egress of the seat occupant when emergency egress from the aircraft by other than the ejection method is desired. The ditching mechanism 16 includes a pivotally mounted shaft 17 having crank arms 18 on either end and a crank arm 19 in the middle. A handle 20 is connected to shaft 17 for manually pivoting the shaft to rotate the crank arms 18 and 19. Separate linkage 21 connects each crank arm 18 to the release assemblies 13 on either side of the seat and a flexible sheathed cable 22 connects crank arm 19 to the shoulder harness release assembly 15. Pivoting of handle 20 in the direction of arrow 23 causes actuation of the release assemblies 13 and 15 for completely releasing the lap belts 12 and shoulder harness 14 to free the occupant from the seat. A ditching mechanism of this or various other types is relatively conventional and is here described only for a clearer understanding of one practical use that may be made of the mechanism 10 of this invention.

In aircraft ejection systems of this and other types, it is conventional to automatically and physically deploy the parachute for the occupant and this is accomplished by firing a drogue gun to deploy a pilot parachute which in turn is connected to and causes deployment of the attached main parachute. The drogue gun is actuated by a firing mechanism 24 and both of these are mounted in the parachute pack worn by the seat occupant. The firing mechanism 24 is actuated by the flexible sheathed cable 25 at the appropriate time during the ejection sequence. The flexible sheathed cable 25 includes a flexible tension actuated cable 26 enclosed within a flexible sheath 27 and tensioned displacement of cable 26 away from mechanism 24 and relative to sheath 27 causes actuation of the firing mechanism 24. This tensioned displacement of cable 26 is accomplished through mechanism 10, in a manner hereinafter described more fully, by tensioning of the flexible cable 28 within tubular housing 29. Tensioning of cable 28 is accomplished through linkage 30 by an actuator 31 mounted on the seat 11. Actuator 31 may be of any conventional type and is activated by the control mechanism (not shown) that is operated by the seat occupant to initiate the ejection sequence. In the ejection sequence prior to complete deployment of the parachute and after separation of the seat from the aircraft, the lap belts 12 and shoulder harness 14 are released such as by automatic actuation of the ditching mechanism 16 or a similar companion mechanism. Thus, the seat and occupant will become separated and yet the flexible sheathed cable 25 is connected between the seat-mounted mechanism 10 and the "occupant-mounted" firing mechanism 24.

Means are provided for disconnecting this seat-occupant connection through sheathed cable 25 and as shown more particularly in FIGS. 2 through 9 of the drawings, these means may include the mechanism 10. Mechanism 10 includes an elongated housing 40 adapted to be mounted on the seat 11 by machine screws 41. Housing 40 includes a cover 42 mounted thereon by a longitudinal hinge 43. Cover 42 may be releasably secured in a closed position on the housing by any convenient means such as a bolt 44 threadedly received in the housing 40. The tubular housing 29 enclosing the flexible actuation cable 28 has a flanged end and is thereby mounted on the bottom of housing 40 by a clamp plate 45 secured by screws 46. Plate 45 is provided with a slot 47 for installation or removal after installation attachment of both ends of cable 28.

The upper end of housing 40 is provided with a cage plate 48 mounted thereon by screws 49. Cage plate 48 has an opening 50 therethrough for receiving the flexible sheathed cable 25. The enclosing sheath 27 is provided with a flared end 51 which fits and is confined between laterally spaced sides 52 and 53 of opening 50 and beneath an undercut finger portion 54 at one lateral end of opening 50. The opposite lateral end of opening 50 from finger 54 may be open whereby plate 48 is a generally C-shape as shown in FIG. 6. The flared end 51 of the sheath 27 fits against the upper end 55 of the housing when positioned beneath the undercut finger portion 54.

A latch 56 is pivotally mounted in housing 40 by pin 57 for pivotal movement toward and away from the undercut finger portion 54 of the cage plate 48. Latch 56 has a hook portion 58 adapted to engage the flared end 51 of the sheath 27 diametrically positioned from the engagement thereof by the undercut finger 54. A release bar 60 is mounted in housing 40 for longitudinal sliding movement relative to the housing. The upper end 61 of release bar 60 has one side supported by a shoulder portion 62 of the housing 40 and has the other side adapted for engaging an abutment 63 on the latch 56. With the release bar 60 in the position shown in FIG. 2, having the upper end 61 engaging the abutment 63, the flared end 51 is captured between the latch hook portion 58 and the undercut finger portion 54 to firmly attach the sheath 27 of the cable 25 to the housing 40. A tension spring 64 is connected bewteen the latch 56 and the release bar 60 in a manner for urging release bar 60 upwardly within a housing 40 and urging latch 56 in the pivotal direction away from engagement with flared end 51, i.e., clockwise as shown in FIG. 2. Release bar 60 is provided with a lateral arm 65 adapted to engage an abutment 66 in housing 40 thereby locating the uppermost position of release bar 60. When the upper end 61 of release bar 60 is position below abutment 63 of the latch 56, the latch 56 is permitted to pivot in the clockwise direction to the position shown in FIGS. 3 and 5, thereby permitting insertion or withdrawal of the flared end 51 from the cage plate 48.

Means are provided in mechanism 10 for releasably connecting flexible cable 26 to flexible cable 28 and, as shown in the drawings, these means comprise the slide mechanism, generally designated 70. Mechanism 70 includes a block 71 slidably mounted in housing 40 for longitudinal movement relatively parallel to the sliding movement of release bar 60. Slide block 71 is laterally confined between one external wall 72 and one internal wall 73 of the housing. Wall 72 is provided with a groove 74 for receiving a protuberance 75 on the block 71 for assuring correct orientation of the slide block 71 when positioned within the housing 40. A terminal fitting 76 on cable 28 is adapted to be connected to the block 71 by a pin 77. The upper end of slide block 71 is provided with an integral claw portion 78 adjacent the outer wall 72. A claw 79 is pivotally mounted on slide block 71 by pin 80 for movement toward and away from claw portion 78. Means are provided for urging claw 79 away from claw portion 78 such as a compression spring 81 extending between claw 79 and claw portion 78 and retained therebetween by separate pins on the claw and claw portion over which the spring 81 is positioned. Latch 56 is provided with an abutment surface 82 adapted to engage the claw 79 when the slide mechanism 70 is in the upper position shown in FIG. 2. Claw 79 is constrained to a "closed" position by engaging abutment 82 when latch 56 is supported by the upper end 61 of release bar 60 is the position shown in FIG. 2, and claw 79 is permitted to move to an "open" position upon withdrawal of release bar 60 to allow pivoting of latch 56 to the position shown in FIG. 3. In the closed position of claw 79, the claw portion 78 cooperates therewith to capture a bead-shaped terminal fitting 83 on cable 26. The separation of claw 79 and claw portion 78 in the opened position of claw 79 is adaqute to allow the terminal fitting 83 to pass therebetween, thereby releasing or allowing insertion of the terminal fitting.

In order to connect the flexible sheathed cable 25 to the mechanism 10 the cover 42 is opened and the release bar 60 is moved to its lower position for allowing pivoting of latch 56 to its open position. The flanged end 51 of sheath 27 is positioned within cage plate 48 and terminal fitting 83 is positioned between claw portion 78 and claw 79. Latch 56 is then pivoted in the counter-clockwise direction to move claw 79 to the closed position capturing terminal fitting 83 and for hook portion 58 to engage and capture flared end 51. The release bar 60 is then allowed to move upwardly for the upper end 61 to engage abutment 63 and thereby retain both the latch 56 and claw 79 in the closed position. Cover 42 may then be closed and secured by bolt 44 and an observation window 84 is provided in cover 42 for visually checking from time to time that the terminal fitting 83 is indeed captured by the claw portion 78 and claw 79. That sheath 27 is captured by hook portion 58 of latch 56 is observable from the top of mechanism 10. Since it is conventional practice to leave the parachute pack in the ejection seat 11 between flights with the occupant strapping himself into the parachute pack only during flights, it is unnecessary to repeatedly attach and detach the sheathed cable 25 from the mechanism 10 although it is highly desirable to make this visual observation that the sheathed cable 25 is properly connected to the mechanism 10.

When rapid egress from the seat 11 is desired by the occupant without employing the ejection system and yet continuing to wear the parachute, the ditching handle 20 is actuated to operate the ditching mechanism 16 in the aforedscribed manner for releasing lap belts 12 and harness 14. Further, the linkage 21 on one side of the ditching mechanism 16 is connected through a rod 85 to the release bar 60. The connection between rod 85 and release bar 60 is of a lost motion type for permitting downward movement of release bar 60 without causing downward movement of connecting rod 85 and yet any downward movement of connecting rod 85 is transmitted to release bar 60. This may be accomplished by any convenient means such as a clevis 86 on connecting rod 85 having an elongated slot 87 for engaging a pin 88 mounted on the lower end of release bar 60. The normal positions of the various components of mechanism 10 are shown in FIG. 2 and actuation of the ditching handle 20 causes downward movement of connecting rod 85 to change the positions of such components to the positions shown in FIG. 3. The downward motion of release bar 60 is arrested by engagement of the lateral arm 65 with a shoulder portion 89 in the housing 40. In this lowered position of release bar 60 the latch 56 and claw 79 are released from the sheath 27 and cable 26, respectively. The release of terminal fitting 83 may be verified through window 84 before pulling the sheathed cable 25 from mechanism 10 which might cause actuation of firing mechanism 24 if the terminal fitting 83 was still captured by the claw 79.

When it is desired to employ the ejection system of the aircraft and such is initiated by the occupant, the actuator 31 causes tensioning of the cable 28 in the manner heretofore described. The tension force on cable 28 causes downward movement of attached slide block 71 within housing 40 while claw 79 is retained in the "closed" position by engagement with abutment surface 82 and internal wall 73. This causes tensioning of cable 26 to actuate the firing mechanism 24. After sufficient displacement of cable 26 has occurred to cause proper actuation, the claw 79 reaches the end 90 of internal wall 73 thereby permitting claw 79 to pivot to the "open" position to release the terminal fitting 83 as shown in FIG. 4. Throughout the thus-far described motion of slide mechanism 70, the release bar 60 remains in the uppermost position constraining latch 56 to the closed position capturing sheath 27. Continued downward movement of slide mechanism 70 as caused by the continued tension displacement of cable 28 causes the lower end 91 of slide block 71 to engage a protruding portion of lateral arm 65 of the release bar thereby urging the release bar downwardly as shown in FIG. 5. It is to be noted that the lost motion connection between release bar 60 and connecting rod 85 permits this downward movement without causing downward movement of connecting rod 85. Movement of release bar 60 to the downward position permits pivoting of the latch 56 to the open position thereby releasing the flared end 51 of sheath 27 from the mechanism. Thus, the flexible cable 26 has been positively operated by the predetermined desired amount of displacement and then the entire sheathed cable 25 is disconnected from mechanism 10 for permitting separation of the seat 11 and occupant.

Having fully described our invention it is to be understood that we do not wish to be limited to the details herein set forth or to the details illustrated in the drawings, but our invention is of the full scope of the appended claims.

We claim:
1. In a mechanism to sequentially operate and disconnect a tension actuated cable and enclosing sheath, the combination of: a latch having means for engaging and retaining the sheath, said latch movable to a position for releasing the sheath, a slide mechanism having a claw means for grasping the cable, said claw means having means movable to a position for releasing the cable, means for releasably retaining said claw means in the cable-grasping position and said latch in the sheath-retaining position, said slide mechanism movable through an adequate distance relative to the sheath for operating the tension actuated cable with said claw means grasping the cable, and means for permitting release of the cable and sheath by the claw means and latch, respectively, upon movement of said slide mechanism beyond the said position of cable actuation.

2. In a mechanism to sequentially operate and disconnect a tension actuated cable and enclosing sheath, the combination of: a latch having means for engaging and retaining the sheath, said latch movable between positions for retaining and releasing the sheath, release means mounted for engaging and locking said latch in the sheath-retaining position and movable to a position for permitting movement of said latch to release the sheath, a movable slide mechanism having releasable claw means for grasping the cable, said slide mechanism movable through an adequate distance for operating the tension actuated cable, means for engaging said claw means and retaining the cable-grasping position thereof during said actuating movement and then releasing said claw means, and said slide mechanism engaging and moving said release means to release the sheath upon the actuating movement of said slide mechanism.

3. In a mechanism to sequentially operate and disconnect a tension actuated cable and enclosing sheath, the combination of: a latch having means for engaging and retaining the sheath, said latch movable between positions for retaining and releasing the sheath, a release bar for engaging and locking said latch in the sheath-retaining position and slidable to a position for permitting movement of said latch to release the sheath, a slide mechanism having releasable claw means for grasping the cable, said slide mechanism slidable through an adequate distance for operating the tension actuated cable, said claw means having means movable to a position for releasing the cable, means for engaging and restraining said claw means in the cable-grasping position throughout said actuating movement and thereafter permitting said movable means of the claw means to move to said cable releasing position, first actuating means connected to said release bar for causing sliding movement of only said release bar for releasing the sheath, and separate second actuating means connected to said slide mechanism for causing sliding movement of said slide mechanism to sequentially tension-actuate and release the cable.

4. In a mechanism to sequentially operate and disconnect a tension actuated cable and enclosing sheath, the combination of: a latch having means for engaging and retaining the sheath in the housing, said latch pivotal between positions for retaining and releasing the sheath, a release bar for engaging and locking said latch in the sheath-retaining position and slidable to a position for permitting pivoting of said latch to release the sheath, a slide mechanism mounted for sliding movement, said slide mechanism having a claw means for grasping the cable, said claw means having means movable to a position for releasing the cable from the claw means, said latch having means for engaging and restraining said claw means in the cable-grasping position, means for restraining said claw means in the cable-grasping position through movement of said slide mechanism an adequate distance for operating the tension actuated cable and then releasing said claw means, said release bar having means for engaging and moving said slide mechanism upon said actuating movement of said slide mechanism for permitting sheath-releasing pivoting of said latch, sliding movement of only said release bar causing releasing the cable and sheath, and sliding movement of said slide mechanism causing sequential tension-actuation and release of the cable and then release of the sheath.

5. In a mechanism to sequentially operate and disconnect a tension actuated cable and enclosing sheath, the combination of: a latch having means for engaging and retaining the sheath in the housing, said latch pivotal between positions for retaining and releasing the sheath, a slide mechanism having releasable claw means for grasping the cable, said latch having means for engaging said claw means for restraining said claw means in the cable-grasping position in the sheath-retaining position of said latch and for permitting said claw means to release the cable in the sheath-releasing position of said latch, means for restraining said claw means in the cable-grasping position through movement of said slide mechanism an adequate distance for operating the tension actuated cable, means operable to release the latch and claw means, first actuating means connected to said operable means for causing operation thereof for releasing the cable and sheath, and separate second actuating means connected to said slide mechanism for causing sliding movement of said slide mechanism to sequentially tension-actuate and release the cable and then release the sheath.

6. In a mechanism to sequentially operate and disconnect a tension actuated cable and enclosing sheath, the combination of: a housing, a latch pivotally mounted in said housing for movement between positions for retaining and releasing the sheath by engagement and disengagement thereof, a release bar slidably mounted in said housing for movement between positions for permitting and preventing said movement of said latch, a slide mechanism slidably mounted in said housing, said slide mechanism having releasable claw means for grasping the cable, means for engaging said claw means for restraining said claw means in the cable-grasping position in the sheath-retaining position of said latch and throughout movement of said slide mechanism an adequate distance for operating the tension actuated cable, there being a relieved portion of said last-mentioned means therebeyond for releasing said claw means, and said release bar having means for engaging said slide mechanism upon movement of said slide mechanism beyond the said position of releasing movement of said claw means for causing sliding movement of said release bar to said position for permitting sheath-releasing pivoting of said latch.

7. In a mechanism to sequentially operate and disconnect a tension actuated cable and enclosing sheath, the combination of: a latch having means for engaging the sheath, said latch pivotal between positions for retaining and releasing the sheath by said engagement, means for engaging and locking said latch in the sheath-retaining position and movable to a position for permitting pivoting of said latch to release the sheath, a slide mechanism mounted for sliding movement a distance adequate for operating the tension actuated cable, said slide mechanism having a claw means for grasping the cable, said claw means having a pivotal element movable to a position for releasing the cable from the claw means, means biasing the pivotal element toward the release position, said latch having means for engaging said pivotal element for restraining said pivotal element in the cable-grasping position in the sheath-retaining position of said latch and for permitting said pivotal element to move to said release position in the sheath-releasing position of said latch, guide means for restraining said pivotal element in the cable-grasping position through said cable operating movement of said slide mechanism and there being a relieved portion of said guide means therebeyond for releasing said pivotal element, and said release bar having means for engaging said slide mechanism upon said movement of said slide mechanism for causing movement of said release bar to said position for permitting sheath-releasing pivoting of said latch.

8. In a mechanism to sequentially operate and disconnect a tension actuated cable and enclosing sheath, the combination of: a housing having means for receiving the ends of the cable and enclosing sheath, a latch pivotally mounted in said housing, said latch having a hook portion for engaging the sheath and retaining the sheath in the housing, said latch pivotal between positions for retaining and releasing the sheath by engagement and disengagement of said hook portion, a release bar slidably mounted in said housing for engaging and locking said latch in the sheath-retaining position and slidable to a position for permitting pivoting of said latch to release the sheath, a slide mechanism mounted in said housing for sliding movement, said slide mechanism having releasable claw means for grasping the cable, means for engaging said claw means for restraining said claw means in the cable-grasping position in the sheath-retaining position of said latch and through movement of said slide mechanism an adequate distance for operating the tension actuated cable, there being a relieved portion of said last-mentioned means therebeyond for releasing said claw means, said release bar having means for engaging said slide mechanism upon movement of said slide mechanism beyond the said position of releasing movement of said claw means into said relieved portion for causing sliding movement of said release bar to said position for permitting sheath-releasing pivoting of said latch, and actuating means connected to said release bar for selectively causing sliding movement of only said release bar for releasing the unactuated cable and sheath.

9. In a mechanism to sequentially operate and disconnect a tension actuated cable and enclosing sheath, the combination of: a latch pivotally mounted in said housing, said latch having means for engaging the sheath and retaining the sheath in the housing, said latch pivotal between positions for retaining and releasing the sheath, a release bar slidably mounted in said housing for engaging and locking said latch in the sheath-retaining position and slidable to a position for permitting pivoting of said latch to release the sheath, a slide mechanism mounted in said housing for sliding movement, said slide mechanism having a claw means for grasping the cable, said claw means having a pivotal element movable to a position for releasing the cable from the claw means, means biasing the pivotal element toward the release position, said latch having means for engaging said pivotal element for restraining said pivotal element in the cable-grasping position in the sheath-retaining position of said latch and for permitting said pivotal element to move to said release position in the sheath-releasing position of said latch, guide means for restraining said pivotal element in the cable grasping position through movement of said slide mechanism an adequate distance for operating the tension actuated cable and there being a relieved portion of said guide means therebeyond for releasing said pivotal element, and said release bar having means for engaging said slide mechanism upon movement of said slide mechanism beyond the said position of releasing movement of said pivotal element into said relieved portion for causing sliding movement of said release bar to said position for permitting sheath-releasing pivoting of said latch.

10. In a mechanism to sequentially operate and disconnect a tension actuated cable and enclosing sheath, the combination of: a housing having means for receiving the ends of the cable and enclosing sheath, a latch pivotally mounted in said housing, said latch having a hook portion for engaging the sheath and retaining the sheath in the housing, said latch pivotal between positions for retaining and releasing the sheath by engagement and disengagement of said hook portion, a release bar slidably mounted in said housing for engaging and locking said latch in the sheath-retaining position and slidable to a position for permitting pivoting of said latch to release the sheath, means biasing said latch toward the sheath-releasing position and the release bar toward the latch-locking position, a slide mechanism mounted in said housing for sliding movement relatively parallel to the motion of said release bar, said slide mechanism having a claw means for grasping the cable, said claw means having a pivotal element movable to a position for releasing the cable from the claw means, means biasing the pivotal element toward the release position, said latch having means for engaging said pivotal element for restraining said pivotal element in the cable-grasping position in the sheath-retaining position of said latch and for permitting said pivotal element to move to said release position in the sheath-releasing position of said latch, guide means for restraining said pivotal element in the cable-grasping position through movement of said slide mechanism an adequate distance for operating the tension actuated cable and there being a relieved portion of said guide means therebeyond for releasing said pivotal element, said release bar having means for engaging said slide mechanism upon movement of said slide mechanism beyond the said position of releasing movement of said pivotal element into said relieved portion for causing sliding movement of said release bar to said position for permitting sheath-releasing pivoting of said latch, first actuating means connected to said release bar for causing sliding movement of only said release bar for releasing the unactuated cable and sheath, and separate second actuating means connected to said slide mechanism for causing sliding movement thereof to sequentially tension-actuate and release the cable and then release the sheath.

11. In a mechanism to sequentially operate and disconnect a tension actuated cable and the enclosing sheath therefor, the combination of: a housing, a latch retaining the sheath in said housing, a claw mechanism grasping said cable and mounted in said housing for sufficient movement to tension actuate the cable, means causing said claw mechanism to release the cable after said actuating movement, and means engaged by further movement of said claw mechanism for causing movement of said latch to release the sheath from said housing subsequent to said actuation and release of the tension cable.

References Cited by the Examiner
UNITED STATES PATENTS

| | | |
|---|---|---|
| 2,478,019 | 8/1949 | Sonntag. |
| 2,665,331 | 1/1954 | Berndt _____ 24—122.3 X |
| 2,825,110 | 3/1958 | Verga _____ 24—230.1 X |
| 3,062,169 | 11/1962 | Cook. |

BERNARD A. GELAK, *Primary Examiner.*